United States Patent
Zou et al.

(10) Patent No.: US 10,360,899 B2
(45) Date of Patent: Jul. 23, 2019

(54) METHOD AND DEVICE FOR PROCESSING SPEECH BASED ON ARTIFICIAL INTELLIGENCE

(71) Applicant: BAIDU ONLINE NETWORK TECHNOLOGY (BEIJING) CO., LTD., Beijing (CN)

(72) Inventors: Wei Zou, Beijing (CN); Xiangang Li, Beijing (CN); Weiwei Cui, Beijing (CN); Jingyuan Hu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 38 days.

(21) Appl. No.: 15/714,820

(22) Filed: Sep. 25, 2017

(65) Prior Publication Data
US 2018/0277099 A1    Sep. 27, 2018

(30) Foreign Application Priority Data
Mar. 24, 2017    (CN) .......................... 2017 1 0184721

(51) Int. Cl.
| | |
|---|---|
| G10L 15/06 | (2013.01) |
| G10L 19/02 | (2013.01) |
| G06N 3/08 | (2006.01) |
| G06N 3/04 | (2006.01) |
| G10L 15/16 | (2006.01) |
| G10L 25/30 | (2013.01) |
| G10L 21/038 | (2013.01) |

(52) U.S. Cl.
CPC .............. *G10L 15/063* (2013.01); *G06N 3/04* (2013.01); *G06N 3/08* (2013.01); *G10L 15/16* (2013.01); *G10L 19/0204* (2013.01); *G10L 21/038* (2013.01); *G10L 25/30* (2013.01); *G10L 2015/0635* (2013.01)

(58) Field of Classification Search
None
See application file for complete search history.

(56) References Cited

U.S. PATENT DOCUMENTS

| | | | | |
|---|---|---|---|---|
| 6,418,408 | B1* | 7/2002 | Udaya Bhaskar | G10L 19/02 |
| | | | | 704/219 |
| 7,433,820 | B2* | 10/2008 | Garg | G06K 9/6297 |
| | | | | 704/256.8 |
| 9,082,416 | B2* | 7/2015 | Krishnan | G10L 25/90 |
| 9,311,298 | B2* | 4/2016 | Sarikaya | G10L 15/18 |
| 9,728,184 | B2* | 8/2017 | Xue | G10L 15/16 |
| 10,261,994 | B2* | 4/2019 | Marcu | G06F 17/2854 |

(Continued)

*Primary Examiner* — Neeraj Sharma
(74) *Attorney, Agent, or Firm* — Hodgson Russ LLP (57) ABSTRACT

The present disclosure provides a method and a device for processing a speech based on artificial intelligence. The method includes: receiving a speech processing request, in which the speech processing request includes a first digital speech signal and a first sample frequency corresponding to the first digital speech signal; selecting a target speech processing model from a pre-trained speech processing model base according to the first sample frequency; performing up-sampling processing on the first digital speech signal using the target speech processing model to generate a second digital speech signal having a second sample frequency, in which the second sample frequency is larger than the first sample frequency.

17 Claims, 4 Drawing Sheets

(56) References Cited

U.S. PATENT DOCUMENTS

| | | | | |
|---|---|---|---|---|
| 2001/0044722 A1* | 11/2001 | Gustafsson | ........... | G10L 21/038 |
| | | | | 704/258 |
| 2009/0144062 A1* | 6/2009 | Ramabadran | ......... | G10L 21/038 |
| | | | | 704/500 |
| 2013/0287203 A1* | 10/2013 | Hodges | ................. | H04M 9/082 |
| | | | | 379/406.01 |
| 2014/0257803 A1* | 9/2014 | Yu | ........................ | G06N 3/0481 |
| | | | | 704/232 |
| 2015/0100312 A1* | 4/2015 | Bocchieri | ............... | G10L 25/24 |
| | | | | 704/232 |

\* cited by examiner

METHOD AND DEVICE FOR PROCESSING SPEECH BASED ON ARTIFICIAL INTELLIGENCE

CROSS-REFERENCE TO RELATED APPLICATION

This application claims priority to and benefits of Chinese Patent Application Serial No. 201710184721.6, filed with the State Intellectual Property Office of P. R. China on Mar. 24, 2017, the entire content of which is incorporated herein by reference.

FIELD

The present disclosure relates to an audio technology field, and more particularly to a method and a device for processing a speech based on artificial intelligence.

BACKGROUND

Artificial intelligence (AI for short) is a new technical science studying and developing theories, methods, techniques and application systems for simulating, extending and expanding human intelligence. The artificial intelligence is a branch of computer science, which attempts to know the essence of intelligence and to produce a new intelligent machine capable of acting in a same way as human intelligence. The researches in this field include robots, speech recognition, image recognition, natural language processing and expert systems, etc.

In speech signal processing, the higher the sample frequency of a digital speech signal is, the more the information contained in the digital speech signal is, and the better the quality of the speech is. Therefore, in technologies such as speech recognition, speech synthesis and the like, a speech having a high sample frequency has obvious performance advantages to a speech having a low sample frequency.

However, in a practical sampling process, the higher the sample frequency is, the higher the requirements for a processing speed and storage of a digital signal processing system are. Therefore, a modest sample frequency is selected to perform sampling on simulation speech signals. This requires to perform up-sampling on a speech signal with a low sample frequency.

In the related art, digital signal processing is usually used to improve the sample frequency of a speech, in which, by inserting a fixed value between sampling points, the number of sampling points in unit time is improved, and then filtering is performed by a low pass filter. However, by the above modes, the fixed value is forcibly inserted between sampling points. This causes that change in speech information is little, generated speech information is insufficient, moreover, the low pass filter may lead to a loss of original information of a speech to some extent. Therefore, quality of obtained speech signal is low, and user experience is poor.

SUMMARY

Embodiments of the present disclosure seek to solve at least one of the problems existing in the related art to at least some extent.

Accordingly, a first objective of the present disclosure is to provide a method for processing a speech based on artificial intelligence. The method realizes up-sampling for a digital speech signal having a low sample frequency, improving quality of a speech signal, and improving user experience.

A second objective of the present disclosure is to provide a device for processing a speech based on artificial intelligence.

A third objective of the present disclosure is to provide another device for processing a speech based on artificial intelligence.

A fourth objective of the present disclosure is to provide a non-transitory computer readable storage medium.

A fifth objective of the present disclosure is to provide a computer program product.

To achieve the above objectives, embodiments of a first aspect of the present disclosure provide a method for processing a speech based on artificial intelligence, including: receiving a speech processing request, in which the speech processing request includes a first digital speech signal and a first sample frequency corresponding to the first digital speech signal; selecting a target speech processing model from a pre-trained speech processing model base according to the first sample frequency; performing up-sampling processing on the first digital speech signal using the target speech processing model to generate a second digital speech signal having a second sample frequency, in which the second sample frequency is larger than the first sample frequency.

To achieve the above objectives, embodiments of a second aspect of the present disclosure provide a device for processing a speech based on artificial intelligence, including: a receiving module, configured to receive a speech processing request, in which the speech processing request includes a first digital speech signal and a first sample frequency corresponding to the first digital speech signal; a first processing module, configured to select a target speech processing model from a pre-trained speech processing model base according to the first sample frequency; a second processing module, configured to perform up-sampling processing on the first digital speech signal using the target speech processing model to generate a second digital speech signal having a second sample frequency, in which the second sample frequency is larger than the first sample frequency.

To achieve the above objectives, embodiments of a third aspect of the present disclosure provide another device for processing a speech based on artificial intelligence, including: a memory; a processor; and computer programs stored in the memory and executable by the processor, in which, when the processor executes the computer programs, the method for processing a speech based on artificial intelligence according to embodiments of the first aspect of the present disclosure is performed.

To achieve the above objectives, embodiments of a fourth aspect of the present disclosure provide a non-transitory computer readable storage medium, when instructions stored therein are executed by a processor of a mobile terminal, the mobile terminal is caused to perform the method for processing a speech based on artificial intelligence according to embodiments of the first aspect of the present disclosure.

To achieve the above objectives, embodiments of a fifth aspect of the present disclosure provide a computer program product, when instructions in the computer program product are executed by a processor, the method for processing a speech based on artificial intelligence according to embodiments of the first aspect of the present disclosure is performed.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In detail, in the related art that, a method for improving a sample frequency of a digital speech signal is realized by a digital signal processing method, in which, the number of sampling points in unit time is improved using an interpolation method, and a low pass filter is used for filtering, thus speech information generated in the related art is not abundant, and it causes a loss of original information of the speech to some extent, and quality of the generated speech signal is poor. Aimed at this problem, embodiments of the present disclosure provide a method for processing a speech based on artificial intelligence, by which, a deep learning method is used to train and learn to obtain a speech processing model, and then the sample frequency of a speech having a low sample frequency is improved with the speech processing model, thus improving quality of a speech signal.

In the following, a method and a device for processing a speech based on artificial intelligence according to embodiments of the present disclosure will be described with reference to drawings.

Figure 1:
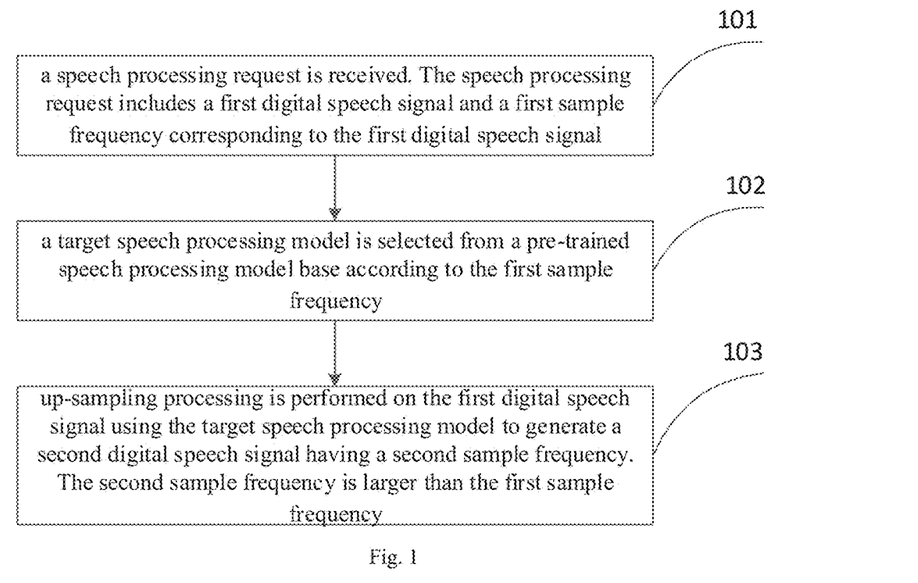
FIG. 1 is a flow chart of a method for processing a speech based on artificial intelligence according to an embodiment of the present disclosure.

FIG. 1 is a flow chart of a method for processing a speech based on artificial intelligence according to an embodiment of the present disclosure.

As illustrated in FIG. 1, the method for processing a speech based on artificial intelligence includes the followings.

In step 101, a speech processing request is received. The speech processing request includes a first digital speech signal and a first sample frequency corresponding to the first digital speech signal.

An executive subject of the method for processing a speech based on artificial intelligence provided by embodiments of the present disclosure is the device for processing a speech based on artificial intelligence provided by embodiments of the present disclosure. The device can be configured in any terminal, so as to improve quality of a speech signal.

In detail, the first digital speech signal is a digital speech signal obtained by sampling a simulation speech signal with the first sample frequency.

The first sample frequency is a number of samples extracted from the simulation speech signal and used to form a digital speech signal in every second. The first sample frequency may be any sample frequency, like 5000 Hertz (5 KHZ), 8 KHZ, etc.

In step 102, a target speech processing model is selected from a pre-trained speech processing model base according to the first sample frequency.

In detail, the speech processing model base includes a plurality of speech processing models generated by training with a large amount of training data and machine learning methods. Each speech processing model can be used to process a digital speech signal having a certain sample frequency to generate a digital speech signal having another certain sample frequency. For example, speech processing model A can be used to process a digital speech signal having a sample frequency of 8 KHZ to generate a digital speech signal having a sample frequency of 16 KHZ, speech processing model B can be used to process a digital speech signal having a sample frequency of 8 KHZ to generate a digital speech signal having a sample frequency of 24 KHZ, speech processing model C can be used to process a digital speech signal having a sample frequency of 16 KHZ to generate a digital speech signal having a sample frequency of 32 KHZ, etc.

In embodiments of the present disclosure, after the device for processing a speech based on artificial intelligence receives the speech processing request, the device can select the target speech processing model from the speech processing model base according to the first sample frequency included in the speech processing request. The target speech processing model can process a digital speech signal having the first sample frequency to generate a digital speech signal having another sample frequency.

In step 103, up-sampling processing is performed on the first digital speech signal using the target speech processing model to generate a second digital speech signal having a second sample frequency. The second sample frequency is larger than the first sample frequency.

It can be understood that, the speech processing model base includes a plurality of speech processing models. Each speech processing model can be used to process a digital speech signal having a certain sample frequency to generate a digital speech signal having another certain sample frequency. Then, in embodiments of the present disclosure, when the target speech processing model is selected from the speech processing model base according to the first sample frequency, one or more target speech processing models may be selected out.

In detail implementation, if one target speech processing model is selected out from the speech processing model base according to the first sample frequency, the target speech processing model can be directly used to perform the up-sampling processing on the first digital speech signal to generate the second digital speech signal having the second sample frequency.

Alternatively, if two target speech processing models are selected out from the speech processing model base according to the first sample frequency, two second digital speech signals having two different second sample frequencies respectively are generated after the up-sampling processing is performed on the first digital speech signal. For example, if the first sample frequency is 8 KHZ, two target speech processing models are selected out from the speech processing model base, and the two target speech processing models can perform the up-sampling on a digital speech signal with a sample frequency of 8 KHZ to obtain a digital speech signal with a sample frequency of 16 KHZ and a digital speech signal with a sample frequency of 24 KHZ respectively, which means that, two digital speech signals having sample frequencies of 16 KHZ and 24 KHZ respectively can be generated after the up-sampling processing is performed on the first digital speech signal using the two selected target speech processing models.

Further, in a possible implementation of this embodiment, when the speech processing request further includes the second sample frequency, a specific target speech processing model can be selected from the speech processing model base according to the first sample frequency and the second sample frequency after the device for processing a speech based on artificial intelligence receives the speech processing request. Then, the up-sampling processing is performed on the first digital speech signal using the target speech processing model to generate the second digital speech signal having the second sample frequency.

It can be understood that, in the related art, with a method for improving a speech sample frequency using interpolation and a low pass filter, because the fixed value is forcibly inserted between sampling points, change in speech information is little, generated speech information is insufficient, and speech quality is poor. However, in the method for processing a speech based on artificial intelligence provided by embodiments of the present disclosure, the target speech processing model used to perform the up-sampling on a speech signal having a low sample frequency is generated by training the deep neural network model with a larger number of digital speech data sample pairs, therefore, a generated speech signal having a high sample frequency is more closer to a real speech signal, which has better quality.

Further, in the method for processing a speech based on artificial intelligence provided in embodiments of the present disclosure, it is unnecessary to filter the speech signal. Therefore, it may not lead to a loss of original information of the speech, thus improving quality of the up-sampled digital speech signal, and improving user experience.

With the method for processing a speech based on artificial intelligence according to embodiments of the present disclosure, firstly, the speech processing request is received, then the target speech processing model is selected from the pre-trained speech processing model base according to the first sample frequency in the speech processing request, and finally the up-sampling processing is performed on the first digital speech signal according to the target speech processing model to generate the second digital speech signal having the second sample frequency. Thus, by performing the up-sampling processing on the digital speech signal having a low sample frequency using the speech processing model, the digital speech signal having a high sample frequency is obtained, thus realizing up-sampling for the digital speech signal having the low sample frequency, improving quality of the speech signal, and improving user experience, It can be known from above analysis that, the up-sampling processing can be performed on the digital speech signal having the low sample frequency using the pre-trained target speech processing model, to generate the digital speech signal having the high sample frequency, thus improving quality of the speech signal. In the following, a method for training and generating a target speech processing model used in the method for processing a speech based on artificial intelligence according to embodiments of the present disclosure will be descripted in detail with reference to FIG. 2.

Figure 2:
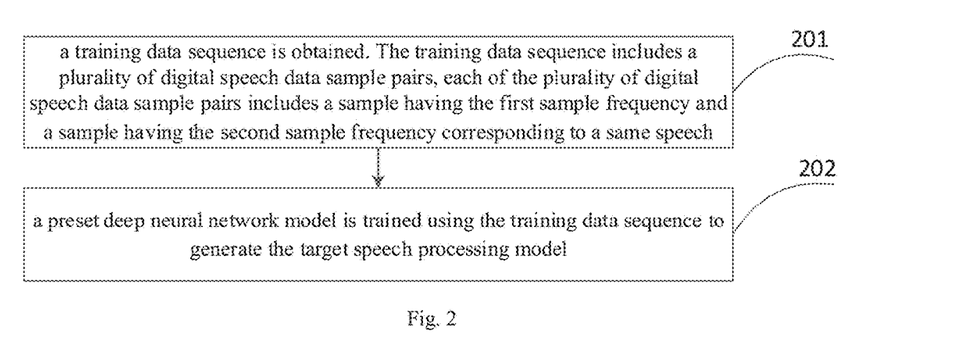
FIG. 2 is a flow chart of a method for training and generating a target speech processing model according to an embodiment of the present disclosure.

FIG. 2 is a flow chart of a method for training and generating a target speech processing model according to an embodiment of the present disclosure.

As illustrated in FIG. 2, the method includes the followings.

In step 201, a training data sequence is obtained. The training data sequence includes a plurality of digital speech data sample pairs, each of the plurality of digital speech data sample pairs includes a sample having the first sample frequency and a sample having the second sample frequency corresponding to a same speech.

In step 202, a preset deep neural network model is trained using the training data sequence, to generate the target speech processing model.

The deep neural network model may be any model that can process sequence data, such as convolution neural network, recursion neural network, and the like.

It can be understood that, different sample frequencies can be used to sample a same simulation speech signal to obtain digital speech signals having different sample frequencies. Then, in embodiments of the present disclosure, the first sample frequency and the second sample frequency can be respectively used for sampling a same simulation speech signal to obtain the sample having the first sample frequency and the sample having the second sample frequency corresponding to a same speech. The sample having the first sample frequency and the sample having the second sample frequency corresponding to a same speech can be taken as a digital speech data sample pair. For a plurality of speech signals, the plurality of digital speech data sample pairs can be obtained by above method. And then, the training data sequence is formed by the plurality of digital speech data sample pairs, such that the preset deep neural network model is trained to generate the target speech processing model.

It should be noted that, the larger the number of the digital speech data sample pairs in the training data sequence is, the better the performance of the target speech processing model generated by training the preset deep neural network model using the training data sequence is. Therefore, in embodiments of the present disclosure, a large number of digital speech data sample pairs can be used to train the preset deep neural network model.

In addition, in embodiments of the present disclosure, other methods can be also used to obtain the training data sequence, to train the preset deep neural network model and to generate the target speech processing model. For example, a method extracting from a sample sequence with a high sample frequency is used to obtain a sample sequence with a low sample frequency. That is, before step 201, the method may further include the followings: performing sampling processing on a plurality of pieces of speech data in a speech data base respectively with the second sample frequency to obtain a sample sequence having the second sample frequency; and extracting a sample sequence having the first sample frequency from the sample sequence having the second sample frequency.

For example, if the first sample frequency H1 is 4 KHZ, and the second sample frequency H2 is 8 KHZ, sampling processing is performed on N pieces of speech data in the speech data base with the sample frequency H2, and the obtained sample sequence having the second sample frequency H2 is $(y_1, y_2, y_3, y_4, \ldots, y_N)$. Information of sampling points included in a sample $y_1$ having the second sample frequency H2 is $y_{11}, y_{12}, y_{13}, y_{14}, y_{15}, y_{16}, y_{17}, y_{18}, \ldots y_{1H2}$, information of sampling points included in a sample $y_2$ is $y_{21}, y_{22}, y_{23}, y_{24}, y_{25}, y_{26}, y_{27}, y_{28}, \ldots y_{2H2}$, etc. Then extraction can be performed on the sample sequence $(y_1, y_2, y_3, y_4, \ldots, y_N)$ having the second sample frequency H2, to obtain a sample sequence $(x_1, x_2, x_3, x_4, \ldots, x_N)$ having the first sample frequency H1. Information of sampling points included in a sample $x_1$ having the first sample frequency H1 may be $y_{12}, y_{14}, y_{16}, y_{18}, \ldots, y_{1H2}$, and information of sampling points included in a sample $x_2$ may be $y_{22}, y_{24}, y_{26}, y_{28}, \ldots y_{2H2}$, etc. Thus, the training data sequence can be formed by the sample sequence having the first sample frequency H1 and the sample sequence having the second sample frequency H2, so as to train the preset deep neural network model to generate the target speech processing model.

Figure 3:
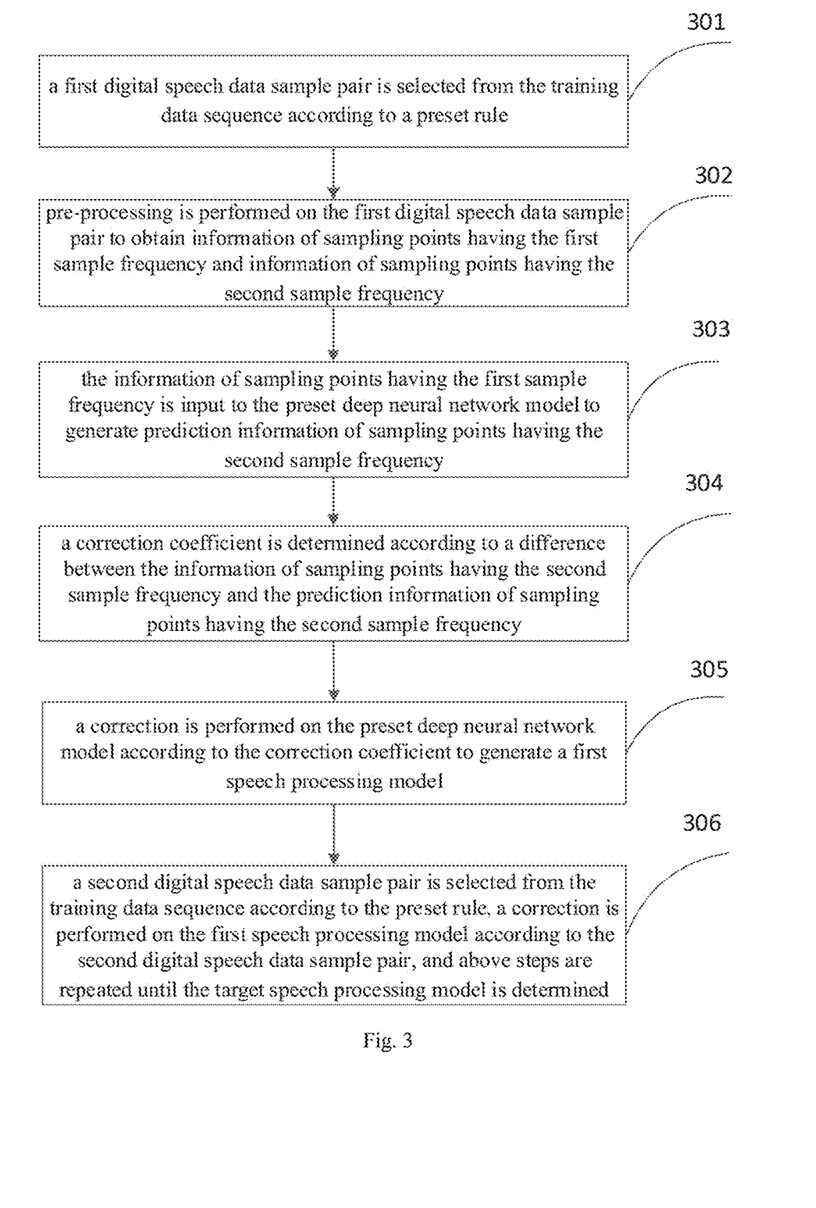
FIG. 3 is a flow chart of a method for training and generating a target speech processing model according to another embodiment of the present disclosure.

In detail, a method illustrated in FIG. 3 can be used to train the preset deep neural network model to generate the target speech processing model, that is, step 202 can include the followings.

In step 301, a first digital speech data sample pair is selected from the training data sequence according to a preset rule.

The preset rule can be set according to actual requirements. For example, the digital speech data sample pairs in the training data sequence can be ordered according a given rule, and then selection begins from the first one of the ordered digital speech data sample pairs, In step 302, pre-processing is performed on the first digital speech data sample pair to obtain information of sampling points having the first sample frequency and information of sampling points having the second sample frequency.

The information of a sampling point is a wave amplitude of a speech signal corresponding to the sampling point.

In step 303, the information of sampling points having the first sample frequency is input to the preset deep neural network model to generate prediction information of sampling points having the second sample frequency.

In detail, weights in the deep neural network model can he preset. Then, an output of the deep neural network model after the information of sampling points is input to the preset deep neural network model is configured as the prediction information of sampling points having the second sample frequency.

For example, supposing that the training data sequence includes a sample sequence $(x_1, x_2, x_3, x_4, \ldots, x_N)$ having the first sample frequency H1, and a sample sequence $(y_1, y_2, y_3, y_4, \ldots, y_N)$ having the second sample frequency H2, if the first digital speech data sample pair is $x_1$ and $y_1$, the information of sampling points input to the preset deep neural network model is the information of sampling points included by the sample $x_1$ in the sample sequence $(x_1, x_2, x_3, x_4, \ldots, x_N)$ having the first sample frequency: $x_{11}, x_{12}, x_{13}, x_{14}, x_{15}, x_{16}, x_{17}, x_{18}, \ldots, x_{1H1}$. After the information of sampling points included by the sample $x_1$ is input to the preset deep neural network model, the prediction information ($z_{11}, z_{12}, z_{13}, z_{14}, z_{15}, z_{16}, z_{17}, z_{18}, \ldots z_{1H2}$) of sampling points having the second sample frequency is generated.

In step 304, a correction coefficient is determined according to a difference between the information of sampling points having the second sample frequency and the prediction information of sampling points having the second sample frequency.

In step 305, a correction is performed on the preset deep neural network model according to the correction coefficient to generate a first speech processing model.

In step 306, a second digital speech data sample pair is selected from the training data sequence according to the preset rule, a correction is performed on the first speech processing model using the second digital speech data sample pair, and above steps are repeated until the target speech processing model is determined.

In detail, after the correction coefficient is determined according to the difference between the information of sampling points having the second sample frequency and the prediction information of sampling points having the second sample frequency, a correction can be performed on the preset deep neural network model. As there are a plurality of digital speech data sample pairs in the training data sequence, above steps 301-305 can he repeated for multiple times. By multiple times of correction, the target speech processing model with well performance can be generated.

A WAVENET deep learning model based on a multi-layer convolutional neural network is taken as an example of the preset deep neural network model to describe the method of for training and generating a target speech processing model in detail.

Figure 4:
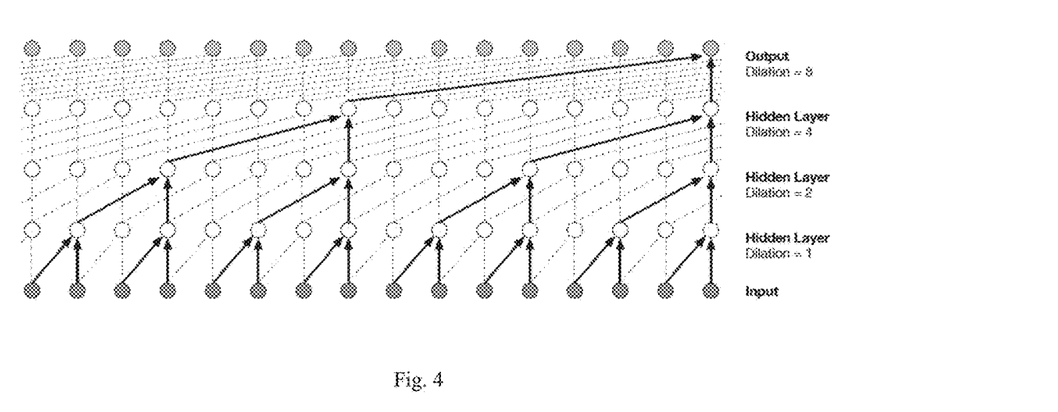
FIG. 4 is a schematic diagram of a WAVENET deep learning model based on a multi-layer convolutional neural network according to an embodiment of the present disclosure.

FIG. 4 is a schematic diagram of a WAVENET deep learning model based on a multi-layer convolutional neural network according to an embodiment of the present disclosure.

A layer in the bottom is an input layer, a layer at the top is an output layer, and three layers in the middle are hidden layers.

It can be understood that, the number of layers in the model and the number of each layer can be set according to actual requirements.

Figure 5:
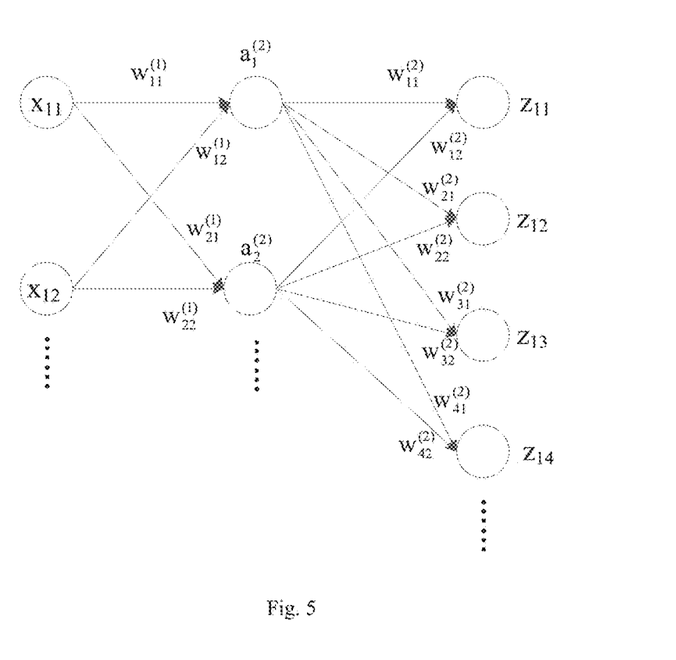
FIG. 5 is a schematic diagram of a WAVENET deep learning model based on a multi-layer convolutional neural network according to another embodiment of the present disclosure.

As illustrated in FIG. 5, in this embodiment, the model includes one hidden layer, taking a partial input and a partial output of the WAVENET deep leaning model as an example.

In embodiments of the present disclosure, initial weights of the WAVENET deep learning model can be preset. After the sampling points having the first sample frequency are input to the input layer of the WAVENET deep learning model, the output layer can output corresponding prediction information of sampling points having the second sample frequency.

It is supposed that the training data sequence includes N digital speech data sample pairs, in which, the sample sequence having the first sample frequency is $(x_1, x_2, x_3, x_4, \ldots, x_N)$, the sample sequence having the second sample frequency is $(y_1, y_2, y_3, y_4, \ldots, y_N)$. The first digital speech data sample pair selected from the training data sequence according to the preset rule is $x_1$ and $y_1$. The information of sampling points included in $x_1$ is $x_{11}, x_{12}, \ldots$, and the information of sampling points included in $y_1$ is $y_{11}, y_{12}, y_{13}, y_{14}, \ldots$. Then information of sampling points input to the WAVENET deep learning model for the first time is $x_{11}, x_{12}, \ldots$, and followings can be known according to structure of the model.

$$a_1^{(2)} = f(w_{11}^{(1)} x_{11} + w_{12}^{(1)} x_{12} + \ldots), a_2^{(2)} = f(w_{21}^{(1)} x_{11} + w_{22}^{(1)} x_{12} + \ldots), \ldots,$$

$$z_{11} = f(w_{11}^{(2)}a_1^{(2)} + w_{12}^{(2)}a_2^{(2)} + \ldots), z_{12} = f(w_{21}^{(2)}a_1^{(2)} + w_{22}^{(2)}a_2^{(2)} + \ldots),$$

$$z_{13} = f(w_{31}^{(2)}a_1^{(2)} + w_{32}^{(2)}a_2^{(2)} + \ldots), z_{14} = f(w_{41}^{(2)}a_1^{(2)} + w_{42}^{(2)}a_2^{(2)} + \ldots), \ldots,$$

Where, $w_{11}^{(1)}, w_{12}^{(1)}, \ldots, w_{41}^{(2)}, w_{42}^{(2)}$ are the initial weights of the model, $z_{11}, z_{12}, z_{13}, z_{14}, \ldots$, are the prediction information of sampling points having the second sample frequency generated after the information $x_{11}, x_{12}, \ldots$ of sampling points having the first sample frequency is input into the model.

By presetting the initial weights of the model, the prediction information $z_{11}, z_{12}, z_{13}, z_{14}, \ldots$ of sampling points having the second sample frequency can be generated after the information $x_{11}, x_{12}, \ldots$ of sampling points having the first sample frequency is input into the model. The information of sampling points included in a sample $y_1$ having the second sample frequency is $y_{11}, y_{12}, y_{13}, y_{14}, \ldots$, then the correction coefficient w1 can be obtained according to a difference between $y_{11}, y_{12}, y_{13}, y_{14}, \ldots$ and $z_{11}, z_{12}, z_{13}, z_{14}, \ldots$. The correction can be performed on the initial weights of the model according to the correction coefficient w1, to obtain weights (i.e., weights in the first target speech processing model) corrected after the first time of correction. A progress of correcting the initial weights can be determined according to actual situations. For example, the correction coefficient w1 can be subtracted from or be added to each of the initial weights $w_{11}^{(1)}, w_{12}^{(1)}, \ldots, w_{41}^{(2)}, w_{41}^{(2)}, \ldots$, or the like.

After a second digital speech data sample pair $x_2$ and $y_2$ is selected from the training data. sequence according to the preset rule, information $x_{21}, x_{22}, \ldots$ of sampling points having the first sample frequency is input to the first speech processing model to obtain prediction information $z_{21}, z_{22}, z_{23}, z_{24}, \ldots$ of sampling points having the second sample frequency. Actual information of sampling points included by a sample $y_2$ having the second sample frequency is $y_{11}, y_{21}, y_{22}, y_{23}, y_{24}, \ldots$, then the correction coefficient w2 can be obtained according to a difference between $y_{11}, y_{21}, y_{22}, y_{23}, y_{24}, \ldots$ and $z_{21}, z_{22}, z_{23}, z_{24}, \ldots$. A further correction can be performed on the weights corrected after a correction, to obtain new weights. By repeating above steps, the preset deep neural network model is corrected for N times according to the N digital speech data sample pairs in the training data sequence, then the target speech processing model is generated.

It should be noted that, when the training data sequence is used to train the preset deep neural network model to generate the target speech processing model, an input of the deep neural network model is the information of sampling points included in samples having the first sample frequency in the training data sequence, and an output of the deep neural network model is the prediction information of sampling points having the second sample frequency, therefore, an input of the trained target speech processing model is information of sampling points of the first digital speech signal having the first sample frequency. That is, before the up-sampling processing is performed on the first speech signal using the target speech processing model, the method may further include: pre-processing the first digital speech signal to obtain the information of sampling points having the first sample frequency.

Similarly, an output of the target speech processing model is the information of sampling points of a second digital speech signal having the second sample frequency. Therefore, in embodiments of the present disclosure, before the second digital speech signal having the second sample frequency is generated, the method may further include: performing up-sampling processing on the first digital speech signal to generate information of sampling points of the second digital speech signal having the second sample frequency; generating the second digital speech signal having the second sample frequency according to the information of sampling points of the second digital speech signal having the second sample frequency.

In addition, in embodiments of the present disclosure, the information of sampling points of the second digital speech signal having the second sample frequency can be directly output by the preset deep neural network model, thus generating the second digital speech signal having the second sample frequency.

Alternatively, by interpolation concept and training, the target speech processing model can process a digital speech signal having the first sample frequency to generate information of sampling points to be interpolated. Thus, the second digital speech signal having the second sample frequency can be formed according to the information of sampling points of the digital speech signal having the first sample frequency and the information of sampling points generated using the target speech processing model.

With the method for processing a speech based on artificial intelligence according to embodiments of the present disclosure, firstly, the speech processing request is received, then the preset deep neural network model is trained using the training data to generate the target speech processing model, and then the target speech processing model is selected from the pre-trained speech processing model base according to the first sample frequency and the second sample frequency in the speech processing request, and finally the up-sampling processing is performed on the first digital speech signal according to the target speech processing model to generate the second digital speech signal having the second sample frequency. Thus, by performing the up-sampling processing on the digital speech signal having a low sample frequency using the speech processing model, the digital speech signal having a high sample frequency is obtained, thus realizing up-sampling for the digital speech signal having the low sample frequency, improving quality of the speech signal, and improving user experience.

Figure 6:
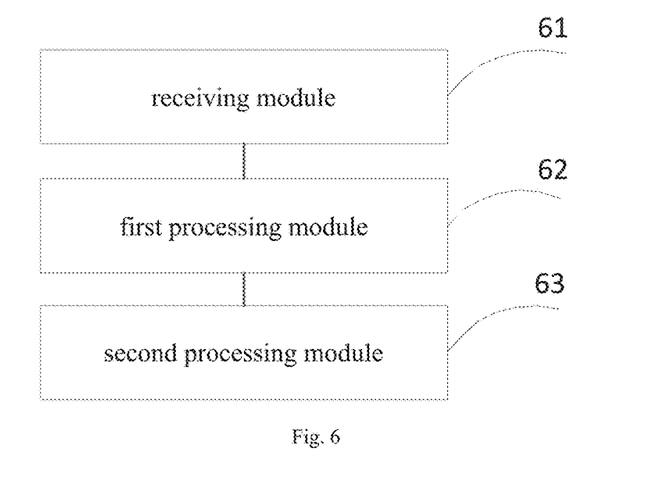
FIG. 6 is a block diagram of a device for processing a speech based on artificial intelligence according to an embodiment of the present disclosure.

FIG. 6 is a block diagram of a device for processing a speech based on artificial intelligence according to an embodiment of the present disclosure.

As illustrated in FIG. 6, the device for processing a speech based on artificial intelligence includes a receiving module 61, a first processing module 62, and a second processing module 63.

The receiving module 61 is configured to receive a speech processing request. The speech processing request includes a first digital speech signal and a first sample frequency corresponding to the first digital speech signal.

The first processing module 62 is configured to select a target speech processing model from a pre-trained speech processing model base according to the first sample frequency.

The second processing module 63 is configured to perform up-sampling processing on the first digital speech signal using the target speech processing model to generate a second digital speech signal having a second sample frequency. The second sample frequency is larger than the first sample frequency.

In a possible implementation of embodiments of the present disclosure, the speech processing request includes the second sample frequency.

Further, the first processing module 62 is configured to select the target speech processing model according to the first sample frequency and the second sample frequency.

The device for processing a speech based on artificial intelligence can be configured in any terminals, to perform the method for processing a speech based on artificial intelligence illustrated in FIG. 1.

It should be noted that, explanation and description in embodiments of the method for processing a speech based on artificial intelligence illustrated in FIG. 1 are also suitable for the device for processing a speech based on artificial intelligence, which are not described in detail herein.

With the device for processing a speech based on artificial intelligence according to embodiments of the present disclosure, firstly, the speech processing request is received, then the target speech processing model is selected from the pre-trained speech processing model base according to the first sample frequency in the speech processing request, and finally the up-sampling processing is performed on the first digital speech signal according to the target speech processing model to generate the second digital speech signal having the second sample frequency. Thus, by performing the up-sampling processing on the digital speech signal having a low sample frequency using the speech processing model, the digital speech signal having a high sample frequency is obtained, thus realizing up-sampling for the digital speech signal having the low sample frequency, improving quality of the speech signal, and improving user experience.

Figure 7:
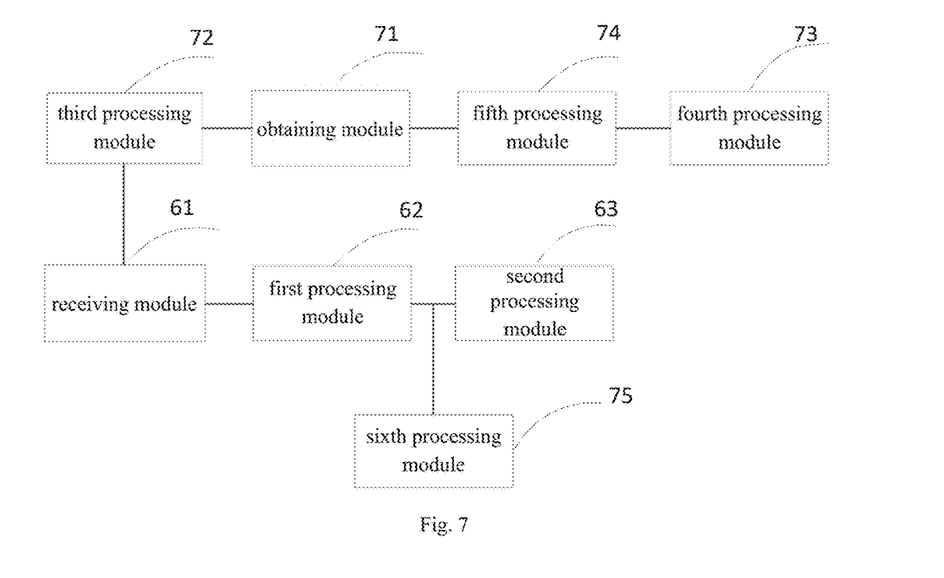
FIG. 7 is a block diagram of a device for processing a speech based on artificial intelligence according to another embodiment of the present disclosure.

FIG. 7 is a block diagram of a device for processing a speech based on artificial intelligence according to another embodiment of the present disclosure.

As illustrated in FIG. 7, based on FIG. 6, the device for processing a speech based on artificial intelligence further includes an obtaining module 71, a third processing module 72, a fourth processing module 73, a fifth processing module 74, and a sixth processing module 75.

The obtaining module 71 is configured to obtain a training data sequence. The training data sequence includes a plurality of digital speech data sample pairs, each of the plurality of digital speech data sample pairs includes a sample having the first sample frequency and a sample having the second sample frequency corresponding to a same speech.

The third processing module 72 is configured to train a preset deep neural network model using the training data sequence to generate the target speech processing model.

The fourth processing module 73 is configured to perform sampling processing on a plurality of pieces of speech data in a speech data base respectively with the second sample frequency to obtain a sample sequence having the second sample frequency.

The fifth processing module 74 is configured to extract a sample sequence having the first sample frequency from the sample sequence having the second sample frequency.

The sixth processing module 75 is configured to pre-process the first digital speech signal to obtain the information of sampling points having the first sample frequency.

In a possible implementation of embodiments of the present disclosure, the third processing module 72 is configured to: select a first digital speech data sample pair from the training data sequence according to a preset rule; perform pre-processing on the first digital speech data sample pair to obtain information of sampling points having the first sample frequency and information of sampling points having the second sample frequency; input the information of sampling points having the first sample frequency to the preset deep neural network model to generate prediction information of sampling points having the second sample frequency; determine a correction coefficient according to a difference between the information of the sampling points having the second sample frequency and the prediction information of the sampling points having the second sample frequency; perform a correction on the preset deep neural network model according to the correction coefficient to generate a first speech processing model; and select a second digital speech data sample pair from the training data sequence according to the preset rule, perform a correction on the first speech processing model according to the second digital speech data sample pair, and repeat above steps until the target speech processing model is determined.

It should be noted that, explanation and description in embodiments of the method for processing a speech based on artificial intelligence illustrated in FIG. 1 are also suitable for the device for processing a speech based on artificial intelligence, which are not described in detail herein.

With the device for processing a speech based on artificial intelligence according to embodiments of the present disclosure, firstly, the speech processing request is received, then the target speech processing model is selected from the pre-trained speech processing model base according to the first sample frequency in the speech processing request, and finally the up-sampling processing is performed on the first digital speech signal according to the target speech processing model to generate the second digital speech signal having the second sample frequency. Thus, by performing the up-sampling processing on the digital speech signal having a low sample frequency using the speech processing model, the digital speech signal having a high sample frequency is obtained, thus realizing up-sampling for the digital speech signal having the low sample frequency, improving quality of the speech signal, and improving user experience.

To achieve the above objectives, embodiments of a third aspect of the present disclosure provide a device for processing a speech based on artificial intelligence, including: a memory; a processor; and computer programs stored in the memory and executable by the processor. When the processor executes the computer programs, the method for processing a speech based on artificial intelligence according to above embodiments is performed.

To achieve the above objectives, embodiments of a fourth aspect of the present disclosure provide a non-transitory computer readable storage medium, having instructions stored therein, when the instructions are executed by a processor, the method for processing a speech based on artificial intelligence according to above embodiments is performed.

To achieve the above objectives, embodiments of a fifth aspect of the present disclosure provide a computer program product, when instructions in the computer program product are executed by a processor, the method for processing a speech based on artificial intelligence according to above embodiments is performed.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. In this specification, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, like two or three, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for processing a speech based on artificial intelligence, comprising:
   receiving a speech processing request, wherein the speech processing request comprises a first digital speech signal and a first sample frequency corresponding to the first digital speech signal;
   selecting a target speech processing model from a pre-trained speech processing model base according to the first sample frequency; and
   performing up-sampling processing on the first digital speech signal using the target speech processing model to generate a second digital speech signal having a second sample frequency, wherein the second sample frequency is larger than the first sample frequency;
   before selecting a target speech processing model, further comprising:
   obtaining a training data sequence, wherein the training data sequence comprises a plurality of digital speech data sample pairs, each of the plurality of digital speech data sample pairs comprises a sample having the first sample frequency and a sample having the second sample frequency corresponding to a same speech; and
   training a preset deep neural network model using the training data sequence to generate the target speech processing model.

2. The method according to claim 1, wherein the speech processing request further comprises the second sample frequency, and selecting a target speech processing model comprises:
   selecting the target speech processing model according to the first sample frequency and the second sample frequency.

3. The method according to claim 1, wherein training a preset deep neural network model using the training data sequence to generate the target speech processing model comprises:

selecting a first digital speech data sample pair from the training data sequence according to a preset rule;

performing pre-processing on the first digital speech data sample pair, and obtaining information of sampling points having the first sample frequency and information of sampling points having the second sample frequency;

inputting the information of the sampling points having the first sample frequency to the preset deep neural network model to generate prediction information of the sampling points having the second sample frequency;

determining a correction coefficient according to a difference between the information of the sampling points having the second sample frequency and the prediction information of the sampling points having the second sample frequency;

performing a correction on the preset deep neural network model according to the correction coefficient to generate a first speech processing model; and selecting a second digital speech data sample pair from the training data sequence according to the preset rule, performing a correction on the first speech processing model using the second digital speech data sample pair, and repeating above steps until the target speech processing model is determined.

4. The method according to claim 1, before obtaining a training data sequence, further comprising:

performing sampling processing on a plurality of pieces of speech data in a speech data base respectively with the second sample frequency to obtain a sample sequence having the second sample frequency; and extracting a sample sequence having the first sample frequency from the sample sequence having the second sample frequency.

5. The method according to claim 3, before performing up-sampling processing on the first digital speech signal using the target speech processing model, further comprising:

pre-processing the first digital speech signal, to obtain the information of the sampling points having the first sample frequency.

6. A method for processing a speech based on artificial intelligence, comprising:

receiving a speech processing request, wherein the speech processing request comprises a first digital speech signal and a first sample frequency corresponding to the first digital speech signal;

selecting a target speech processing model from a pre-trained speech processing model base according to the first sample frequency; and performing up-sampling processing on the first digital speech signal using the target speech processing model to generate a second digital speech signal having a second sample frequency, wherein the second sample frequency is larger than the first sample frequency;

wherein performing up-sampling processing on the first digital speech signal using the target speech processing model to generate a second digital speech signal having a second sample frequency comprises:

performing the up-sampling processing on the first digital speech signal to generate information of sampling points of the second digital speech signal having the second sample frequency; and generating the second digital speech signal having the second sample frequency according to the information of sampling points of the second digital speech signal having the second sample frequency.

7. The method according to claim 5, wherein performing up-sampling processing on the first digital speech signal using the target speech processing model to generate a second digital speech signal having a second sample frequency comprises:

processing the first digital speech signal by interpolating and training using the target speech processing model, to generate information of sampling points to be interpolated; and forming the second digital speech signal having the second sample frequency according to the information of the sampling points having the first sample frequency and the information of sampling points to be interpolated.

8. The method according to claim 3, wherein the information of a sampling point is a wave amplitude of a speech signal corresponding to the sampling point.

9. A device for processing a speech based on artificial intelligence, comprising:

a memory having computer programs executable by the processor; and a processor;

wherein the processor is configured to:

receive a speech processing request, wherein the speech processing request comprises a first digital speech signal and a first sample frequency corresponding to the first digital speech signal;

obtain a training data sequence, wherein the training data sequence comprises a plurality of digital speech data sample pairs, each of the plurality of digital speech data sample pairs comprises a sample having the first sample frequency and a sample having the second sample frequency corresponding to a same speech;

train a preset deep neural network model using the training data sequence to generate the target speech processing model;

select a target speech processing model from a pre-trained speech processing model base according to the first sample frequency; and perform up-sampling processing on the first digital speech signal using the target speech processing model to generate a second digital speech signal having a second sample frequency, wherein the second sample frequency is larger than the first sample frequency.

10. The device according to claim 9, wherein the speech processing request further comprises the second sample frequency, and the processor is configured to select a target speech processing model by selecting the target speech processing model according to the first sample frequency and the second sample frequency.

11. The device according to claim 9, wherein the processor is configured to train a preset deep neural network model using the training data sequence to generate the target speech processing model by:

selecting a first digital speech data sample pair from the training data sequence according to a preset rule;

performing pre-processing on the first digital speech data sample pair, and obtaining information of sampling points having the first sample frequency and information of sampling points having the second sample frequency;

inputting the information of the sampling points having the first sample frequency to the preset deep neural network model to generate prediction information of the sampling points having the second sample frequency;

determining a correction coefficient according to a difference between the information of the sampling points having the second sample frequency and the prediction information of the sampling points having the second sample frequency;

performing a correction on the preset deep neural network model according to the correction coefficient to generate a first speech processing model; and selecting a second digital speech data sample pair from the training data sequence according to the preset rule, performing a correction on the first speech processing model using the second digital speech data sample pair, and repeating above steps until the target speech processing model is determined.

12. The device according to claim 9, wherein the processor is further configured to:

perform sampling processing on a plurality of pieces of speech data in a speech data base respectively with the second sample frequency to obtain a sample sequence having the second sample frequency; and extract a sample sequence having the first sample frequency from the sample sequence having the second sample frequency.

13. The device according to claim 11, wherein the processor is further configured to:

pre-process the first digital speech signal to obtain the information of the sampling points having the first sample frequency.

14. A device for processing a speech based on artificial intelligence, comprising:

a memory having computer programs executable by the processor; and a processor;

wherein the processor is configured to;

receive a speech processing request, wherein the speech processing request comprises a first digital speech signal and a first sample frequency corresponding to the first digital speech signal;

select a target speech processing model from a pre-trained speech processing model base according to the first sample frequency; and perform up-sampling processing on the first digital speech signal using the target speech processing model to generate a second digital speech signal having a second sample frequency, wherein the second sample frequency is larger than the first sample frequency;

wherein the processor is configured to perform up-sampling processing on the first digital speech signal using the target speech processing model to generate a second digital speech signal having a second sample frequency by:

performing the up-sampling processing on the first digital speech signal to generate information of sampling points of the second digital speech signal having the second sample frequency; and generating the second digital speech signal having the second sample frequency according to the information of sampling points of the second digital speech signal having the second sample frequency.

15. The method according to claim 13, wherein the processor is configured to perform up-sampling processing on the first digital speech signal using the target speech processing model to generate a second digital speech signal having a second sample frequency by:

processing the first digital speech signal by interpolating and training using the target speech processing model, to generate information of sampling points to be interpolated; and forming the second digital speech signal having the second sample frequency according to the information of the sampling points having the first sample frequency and the information of sampling points to be interpolated.

16. The method according to claim 11, wherein the information of a sampling point is a wave amplitude of a speech signal corresponding to the sampling point.

17. A non-transitory computer readable storage medium, storing computer programs therein, wherein when the computer programs are executed by a processor, a method for processing a speech based on artificial intelligence is performed comprising:

receiving a speech processing request, wherein the speech processing request comprises a first digital speech signal and a first sample frequency corresponding to the first digital speech signal;

obtaining a training data sequence, wherein the training data sequence comprises a plurality of digital speech data sample pairs, each of the plurality of digital speech data sample pairs comprises a sample having the first sample frequency and a sample having the second sample frequency corresponding to a same speech;

training a preset deep neural network model using the training data sequence to generate the target speech processing model selecting a target speech processing model from a pre-trained speech processing model base according to the first sample frequency; and performing up-sampling processing on the first digital speech signal using the target speech processing model to generate a second digital speech signal having a second sample frequency, wherein the second sample frequency is larger than the first sample frequency.

* * * * *